United States Patent
Goko et al.

(10) Patent No.: US 6,981,109 B2
(45) Date of Patent: Dec. 27, 2005

(54) DIGITAL SIGNAL PROCESSOR SYSTEM HAVING PROGRAMMABLE RANDOM ACCESS MEMORY THAT EXECUTES PROCESSING DURING DOWNLOADING OF A PROGRAM

(75) Inventors: Hiroki Goko, Tokyo (JP); Fumihiro Wajima, Tokyo (JP); Yuji Fujiki, Tokyo (JP); Junichi Tamura, Tokyo (JP); Ali Elhadri, Tokyo (JP); Nobuyuki Endo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 506 days.

(21) Appl. No.: 10/252,402

(22) Filed: Sep. 24, 2002

(65) Prior Publication Data

US 2003/0154354 A1 Aug. 14, 2003

(30) Foreign Application Priority Data

Feb. 12, 2002 (JP) ............................. 2002-033857

(51) Int. Cl.⁷ ............................................ G06F 12/14
(52) U.S. Cl. .................... 711/152; 711/150; 711/163; 713/600
(58) Field of Search ....................... 711/150, 152, 163; 713/600

(56) References Cited

U.S. PATENT DOCUMENTS

| | | | | |
|---|---|---|---|---|
| 5,452,434 A | * | 9/1995 | MacDonald | 713/601 |
| 5,557,762 A | * | 9/1996 | Okuaki et al. | 714/34 |
| 5,991,849 A | * | 11/1999 | Yamada et al. | 711/103 |
| 6,449,476 B1 | * | 9/2002 | Hutchison et al. | 455/418 |
| 2003/0041276 A1 | * | 2/2003 | Koyama | 713/400 |
| 2003/0046600 A1 | * | 3/2003 | Shimizu et al. | 713/600 |
| 2003/0093612 A1 | * | 5/2003 | Ootani et al. | 711/103 |

FOREIGN PATENT DOCUMENTS

| | | | | |
|---|---|---|---|---|
| EP | 470624 A2 | * | 2/1992 | G06F 13/28 |
| EP | 579369 A1 | * | 1/1994 | G06F 1/32 |

* cited by examiner

*Primary Examiner*—Matthew D. Anderson
*Assistant Examiner*—Hetul Patel
(74) *Attorney, Agent, or Firm*—Volentine Francos & Whitt, PLLC

(57) ABSTRACT

A digital signal processor includes a programmable memory, a processor and an access controller. The programmable memory has blocks each of which is capable of reading and writing an instruction of a program. The processor sequentially executes the instruction stored in the programmable memory. The access controller sequentially stores the instruction of the program in the blocks of the programmable memory on the basis of an address indicating a location of the respective blocks where the instruction is stored. The access controller controls an access of the processor to the respective blocks.

18 Claims, 10 Drawing Sheets

DIGITAL SIGNAL PROCESSOR SYSTEM HAVING PROGRAMMABLE RANDOM ACCESS MEMORY THAT EXECUTES PROCESSING DURING DOWNLOADING OF A PROGRAM

BACKGROUND OF THE INVENTION

The present invention relates to a digital signal processor (DSP) system equipped with a programmable RAM (hereinafter referred to as PRAM) for storing program data, and a controlling method thereof.

A Digital Signal Processor (referred to hereinafter as a DSP) refers to a processor for executing digital signal processing. The same is a type of microprocessor in internal structure, with a hardware multiplier installed therein, having functions for specialized application in signal processing such as simultaneous execution of multiplication and addition, and so forth, to enable processing of product-sum operation heavily used in signal processing to be executed at high speed.

The DSP is capable of having processing functions of JAVA virtual machine (JAVA: registered trademark), MP3 playback machine, and so forth by processing not only a user interface (key manipulation and a display) formed in a cellular phone, and so on, but also a variety of programs from a PRAM, a ROM (Read Only Memory), an so on.

With the DSP of the above-described configuration, however, the DSP has to be in as-queued state until completion of downloading of a program in whole, so that a problem has been encountered in that much time is required before starting execution of the program.

SUMMARY OF THE INVENTION

In light of the problem as described, the present invention may provide a digital signal processor system capable of executing digital signal processing even during downloading of a program. A digital signal processor includes a programmable memory, a processor and an access controller. The programmable memory has blocks each of which is capable of reading and writing an instruction of a program. The processor sequentially executes the instruction stored in the programmable memory. The access controller sequentially stores the instruction of the program in the blocks of the programmable memory on the basis of an address indicating a location of the respective blocks where the instruction is stored. The access controller controls an access of the processor to the respective blocks.

DETAILED DESCRIPTION OF THE PREFERRED EMBODIMENTS

Figure 1:
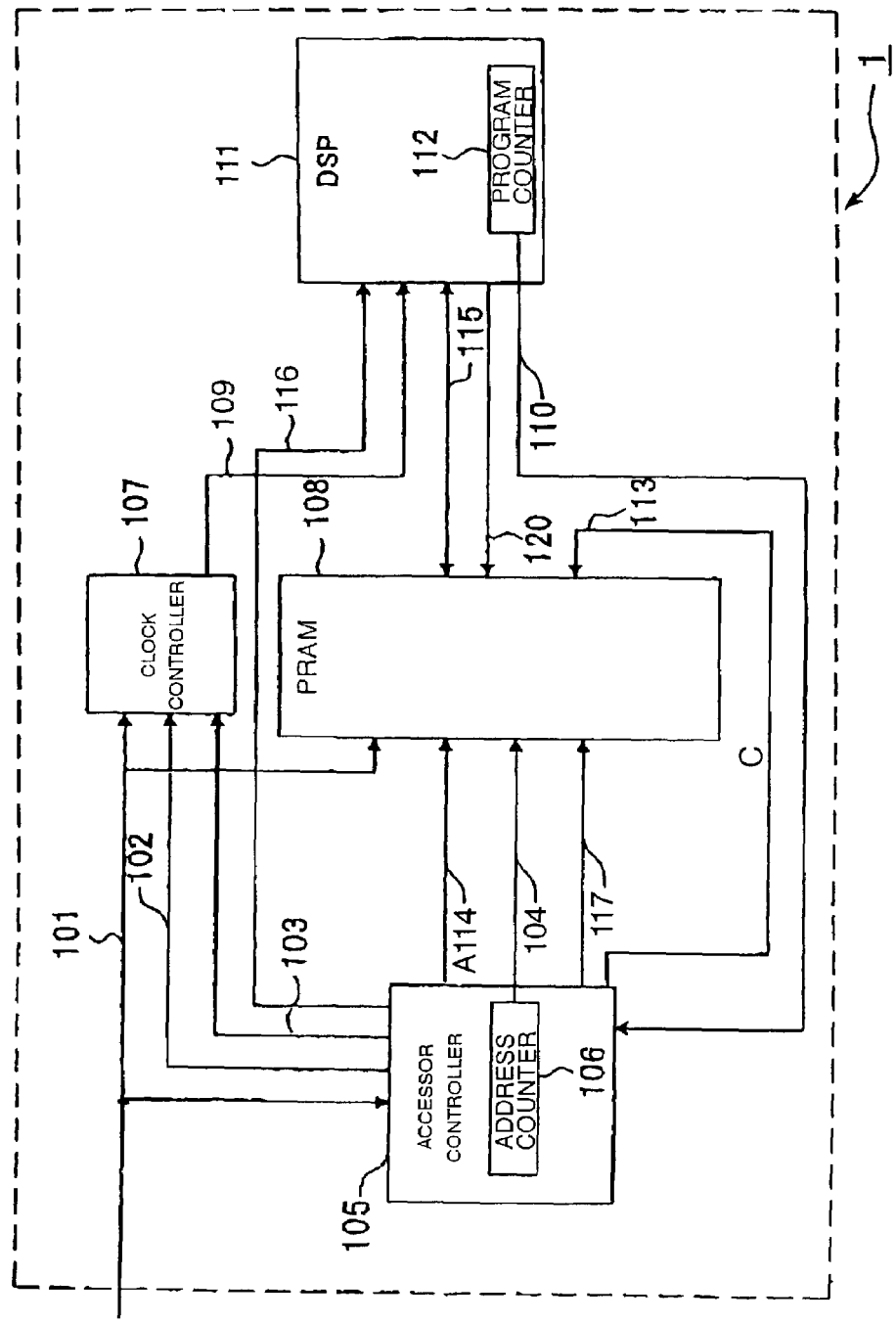
FIG. 1 is a block diagram showing the configuration of a first embodiment of a digital signal processor system according to the invention.

Preferred embodiment of a digital signal processor (DSP) system according to the invention are described in detail hereinafter with reference to the accompanying drawings. In the following description and accompanying drawings, constituent elements having substantially the same function and configuration are denoted by like reference numerals thereby omitting duplicated description.

First Embodiment

First, referring to FIG. 1, the configuration of a first embodiment of a digital signal processor system according to the invention is described. FIG. 1 is a block diagram showing the configuration of the first embodiment of the digital signal processor system according to the invention.

As shown in FIG. 1, the digital signal processor system 1 comprises an access controller 105, and a clock controller 107 in addition to a PRAM 108 made up of a dual port RAM, and a DSP 111 for performing processing and so on.

The access controller 105 is provided with an address counter 106 for determining an address of a block of the PRAM 108 where data such as instructions of a program, as downloaded, is stored.

The address determined by the address counter 106 is connected to the PRAM 108 via a program address bus A104, and information on the address is thereby transmitted to the PRAM 108.

Further, the data such as the instructions of the program, down loaded, is connected to the PRAM 108 via a program address bus A114 from the access controller 105, and is stored in the block by writing the data such as the instructions of the program to the PRAM 108.

Furthermore, a R/W control B117 is used as a control signal for controlling a timing at which the access controller 105 performs read/write processing of the data such as the instructions and so on of the program against the PRAM 108.

The access controller 105 outputs a DSP reset signal 116 for permitting the DSP 111 to gain access to the PRAM 108, and the DSP reset signal 116 is inputted to the DSP 111.

The DSP 111 is provided with a program counter 112 for use in processing and so on of the data such as the instructions of the program, received from the PRAM 108. A program address outputted from the program counter 112 is inputted to the access controller 105 via a program address bus B110.

Further, a program data bus B115, which is bidirectional, interconnects between the DSP 111 and the PRAM 108, and processing for read/write, and so on of the data such as the instructions of the program is performed via the program data bus B115. Furthermore, the DSP 111 is reset by a reset signal 116, and a R/W control A120 signal outputted by the DSP 111 has substantially the same function as that of a common type digital signal processor system.

The access controller 105 outputs the program address signal from the DSP 111, an access of which is controlled by the access controller 105, to be inputted to the PRAM 108 via a program address bus C113.

The clock controller 107 receives a system clock 101 from outside, and a download complete signal 102 or a wait signal 103 which is a halt signal, and performs control, and so on of clock signals against the DSP 111. Further, the clock controller 107 outputs a DSP clock 109 to the DSP 111, and on the basis of the DSP clock 109, the DSP 111 performs processing and so forth.

Figure 2:
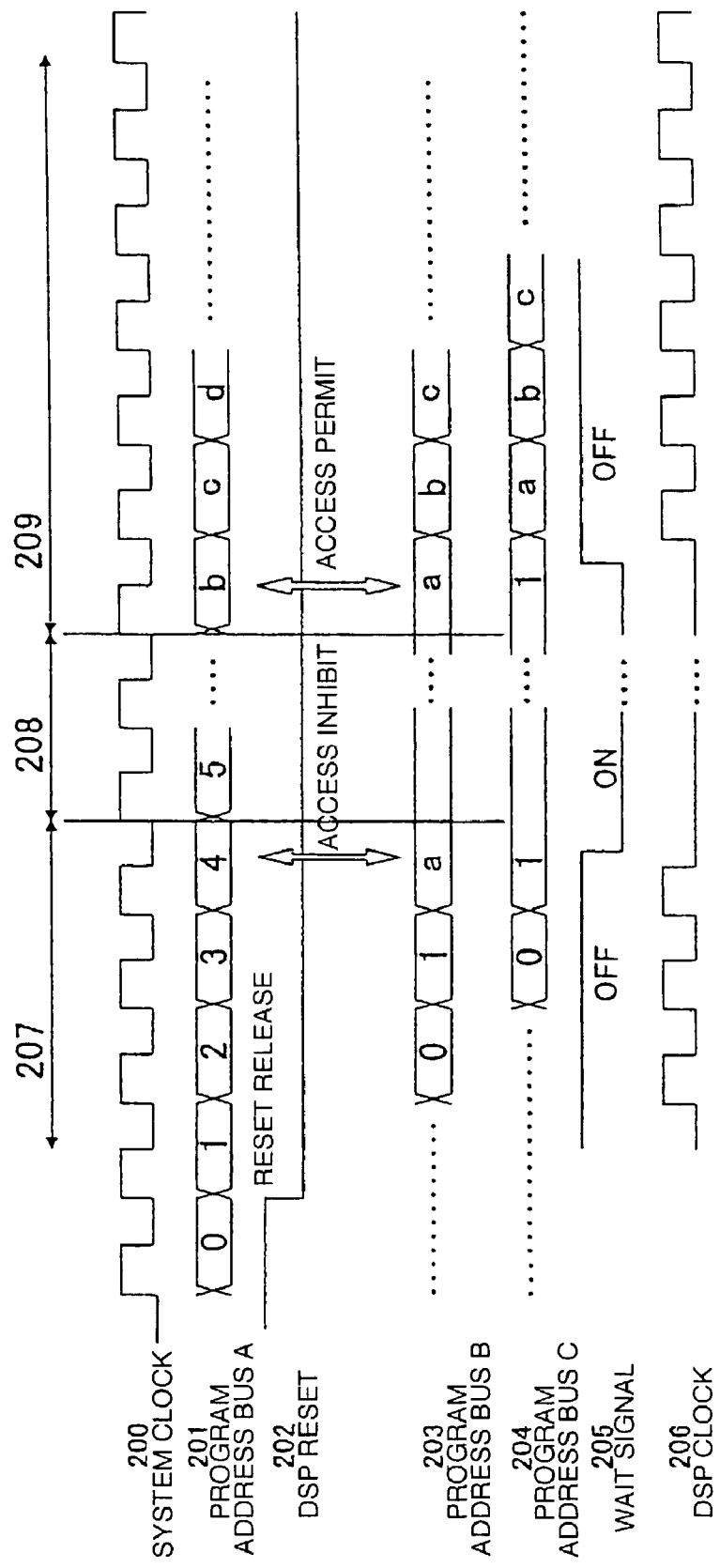
FIG. 2 is a timing diagram showing the operation of the digital signal processor system according to the first embodiment.

Subsequently, referring to FIGS. 1 and 2, operation of the digital signal processor system according to the first embodiment is described hereinafter. FIG. 2 is a timing diagram showing the operation of the digital signal processor system according to the first embodiment.

As shown in FIG. 1, the access controller 105 downloads data such as instructions of a program, and so forth to be stored in a block at a predetermined address of the PRAM 108, and performs control of access of the DSP 111.

As reading of a program is executed from the DSP 111 to the PRAM 108 while writing of a program is executed from the access controller 105 to the PRAM 108, the R/W control A120 signal is in read mode while the R/W control B117 signal is in write mode.

First, referring to FIGS. 1 and 2, operation of the digital signal processor system 1 during a period 207 shown in FIG. 2 is described hereinafter.

As shown in FIG. 2, the access controller 105 downloads data such as instructions of a program to be stored in a block of the PRAM 108. An address of the block where the data is stored is determined by the address counter 106. As shown by a waveform 201 which is a waveform of the program address bus A104, it can be seen that, in the case of the present embodiment, an address value of respective blocks where respective data are stored sequentially increases from an address "0" onwards.

In the case where the address value of a block where data downloaded by the access controller 105 is stored is an address "0", there does not exist an area to which the DSP 111 can gain access. Accordingly, as shown by a waveform 202 which is a waveform of the DSP reset signal 116, the DSP reset signal 116 outputted by the access controller 105 remains ON (high level), so that the DSP 111 is unable to gain access to the PRAM 108.

Upon an address value of address data outputted via the program address bus A104 turning to an address "1", the DSP reset signal 116 (the waveform 202) turns OFF (low level), enabling the DSP 111 to gain access to the PRAM 108.

The DSP 111 outputs a predetermined address of the data such as the instruction of the program to the program address bus B110 to enable the DSP 111 to perform processing through the program counter 112.

As shown in FIG. 2, it can be seen that a waveform 203 which is a waveform indicating the program address bus B110 starts from an address "0" in the case of the first embodiment.

The program address described above has already been inputted to the access controller 105, and the access controller 105 compares an address value inputted via the program address bus B110 (the waveform 203) with an address value of the program address bus A104 (the waveform 201), outputted from the address counter 106, thereby determining whether an address to which the DSP 111 attempts to gain access is an address already downloaded by the access controller 105, and stored in a block.

In the case where results of determination as described above show that the DSP 111 attempts to gain access to the address already downloaded and stored in the block, the address value inputted via the program address bus B110 is outputted to the program address bus C113 (a waveform 204) in the subsequent cycle.

As shown in FIG. 2, as for the waveform 204 which is a waveform indicating the program address bus C113, the address value already downloaded and stored, inputted from the program address bus B110, is outputted as an address value of the program address bus C113 in the subsequent cycle.

Next, the operation of the digital signal processor system 1 during a period 208 in the case where the address value inputted from the program address bus B110 (the waveform 203) falls within an access inhibit area, that is, an area where an address has not been downloaded as yet, causing the DSP 111 to be in an access halt condition.

The DSP 111 outputs the determined address on the data such as the instruction of the program to the program address bus B110 (the waveform 203) to enable the DSP 111 to perform processing through the program counter 112.

The address value outputted via the program address bus B110 (the waveform 203) is compared with the address value outputted to the address counter 106 (the waveform 201), and consequently, whether or not the address value falls in the access inhibit area is determined. The address conditions in the case of address values being in the access inhibit area are shown by a relationship represented by the following expression (1): address value of the address counter 106 £ address value of the program address bus B110 ¼ (1)

During the period 207 in FIG. 2, immediately before the period 208 when the address value falls in the access inhibit area, the value of an address (the program address bus A) where the data such as the instruction of the program is downloaded and stored is an address "4" (the waveform 201) in (the access controller 105 while the DSP 111 attempts to gain access to an address value (a program address bus B) of an address "a" (the waveform 203) of the PRAM 108. Accordingly, the conditions according to the expression (1) described above are satisfied.

Upon detection of the conditions for the access inhibit area, the access controller 105 first turns ON (low level) a wait signal 103 (a waveform 205) which is a halt signal for stopping an access by the DSP 111 (the waveform 205).

Upon receiving the wait signal 103 (the waveform 205) which is the halt signal, the clock controller 107 halts outputting a DSP clock 109, whereupon the DSP 111 makes a transition to an access halt condition where no access is permitted (a waveform 206). The transition to the access halt condition where no access is permitted is hereinafter referred to as processing for transition to the DSP access halt condition.

Further, the address value of the program address bus C113, outputted from the access controller 105, is not updated in the subsequent cycle, and is kept at the address "1" which is the preceding address value in an accessible area (the waveform 204).

While the access controller 105 keeps the wait signal 103 (the waveform 205) in the "ON" (low level) condition, the program counter 112 of the DSP 111 with the DSP clock in halting state is in the halt condition. Consequently, the program address bus B is not updated, and keeps outputting the address "a" so as to be held (the waveform 203).

As described in the foregoing, as a result of series of operations from the case where the DSP 111 attempts to gain access to the PRAM 108 while the address value falls in the access inhibit area during the period 207 immediately before the period 208 up to the period 208 when the DSP 111 makes a transition to the access halt condition, keeping the condition, access from the DSP 111 to the PRAM 108 is in the halt condition. Regardless of the access halt condition of the DSP 111, however, the address counter 106 configured in the access controller 105 operates, and continues processing for downloading and storing the data such as the instructions of the program in the PRAM 108 (the waveform 201).

Subsequently, referring to FIG. 2, operation of the digital signal processor system 1 during a period 209 in the case where the DSP is released from the access halt condition (hereinafter referred to as processing for release from the DSP access halt condition).

Subsequently, referring to FIG. 2, operation of the digital signal processor system 1 during a period 209 in the case where the DSP is released from the access halt condition (hereinafter referred to as processing for release from the DSP access halt condition) is described.

As shown in FIG. 2, in the case where the DSP is released from the access halt condition as the address "a" to which the DSP 111 attempts to gain access in the period 207 coincides with a count (the waveform 201) of the address value of the program address bus A104 outputted by the address counter 106, that is, in the case where the address conditions are shown by a relationship represented by the following expression (2) in the period 208 when the DSP is in the access halt condition, the wait signal 103 which has been in the "ON" (low level) condition is turned OFF (high level) (the waveform 205): address value of the address counter 106>address value of the program address bus B110 ¼ (2).

The address value "1" of the program address bus C113, kept in the period 207, is updated to the address value "a" required by the DSP 111 in the subsequent cycle in a period 209 (the waveform 204).

Further, responding to the wait signal 103 (the waveform 205) outputted from the access controller 105, turning from the "ON" (low level) condition to the "OFF" (high level) condition, the clock controller 107 resumes outputting the DSP clock 109 (the waveform 206).

With the DSP 111, to which input of the DSP clock 109 from the clock controller 107 is resumed, the program counter 112 thereof restarts operation, and the DSP 111 starts access to the PRAM 108, outputting an updated program address to the program address bus B110 (the waveform 203).

When downloading is all completed, the access controller 105 turns the download complete signal 102 ON (not shown), which is transmitted to the clock controller 107. When the download complete signal 102 is in the ON condition, the clock controller 107 does not execute control of clocks, outputting the system clock 101 as it is to the DSP clock 109.

As described hereinbefore, with the DSP system which has been forced in the past to be in as-queued state until full completion of downloading of the program, processing operation thereof becomes possible even before full completion of downloading of the program by installation of devices such as the access controller 105, the clock controller 107, and so forth. For example, in the case where there occurs branching (occurring due to a branch instruction during processing by the DSP 111 for execution of a program) to areas where downloading has not been completed as yet, by causing the DSP 111 to make a transition to the access halt condition until the completion of downloading, and by keeping the access halt condition, it becomes possible to start and process the execution of respective instructions and so forth of a program while downloading the respective instructions to be stored, so that time required for initialization of the program can be shortened.

In particular, even if there occurs the halt condition (wait) to the processing operation of the DSP, the invention is quite effective in the case of the initialization routine of a register, and so forth, not particularly affected thereby.

Second Embodiment

Figure 3:
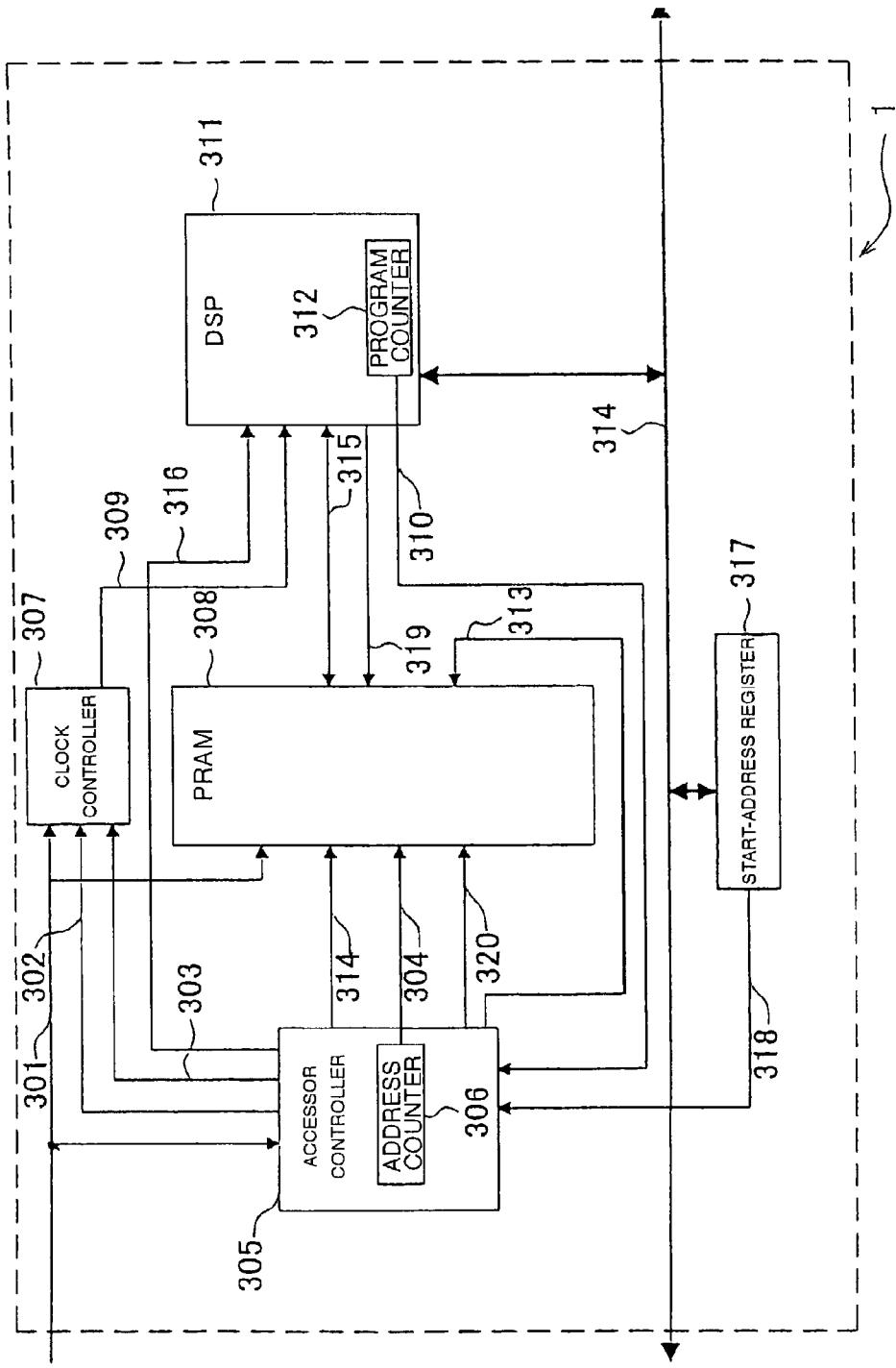
FIG. 3 is a block diagram showing the configuration of a second embodiment of the digital signal processor system according to the invention.

Next, referring to FIG. 3, the configuration of a second embodiment of a digital signal processor system according to the invention is described. FIG. 3 is a block diagram showing the configuration of the second embodiment of the digital signal processor system according to the invention.

As shown in FIG. 3, the digital signal processor system according to the second embodiment of the invention is obtained by adding a data bus 314, a start-address register 317, and a start-address 318 to the digital signal processor system according to the first embodiment.

The data bus 314 is connected to a DSP 311 and the start-address register 317, and the start-address register 317 for indicating a start of an access halt condition of the DSP is connected to an access controller 305 via the start-address 318.

Further, other devices configured in the digital signal processor system 1 according to the second embodiment are substantially the same in configuration as those of the digital signal processor system 1 according to the first embodiment, corresponding thereto, omitting therefore detailed description thereof.

Figure 4:
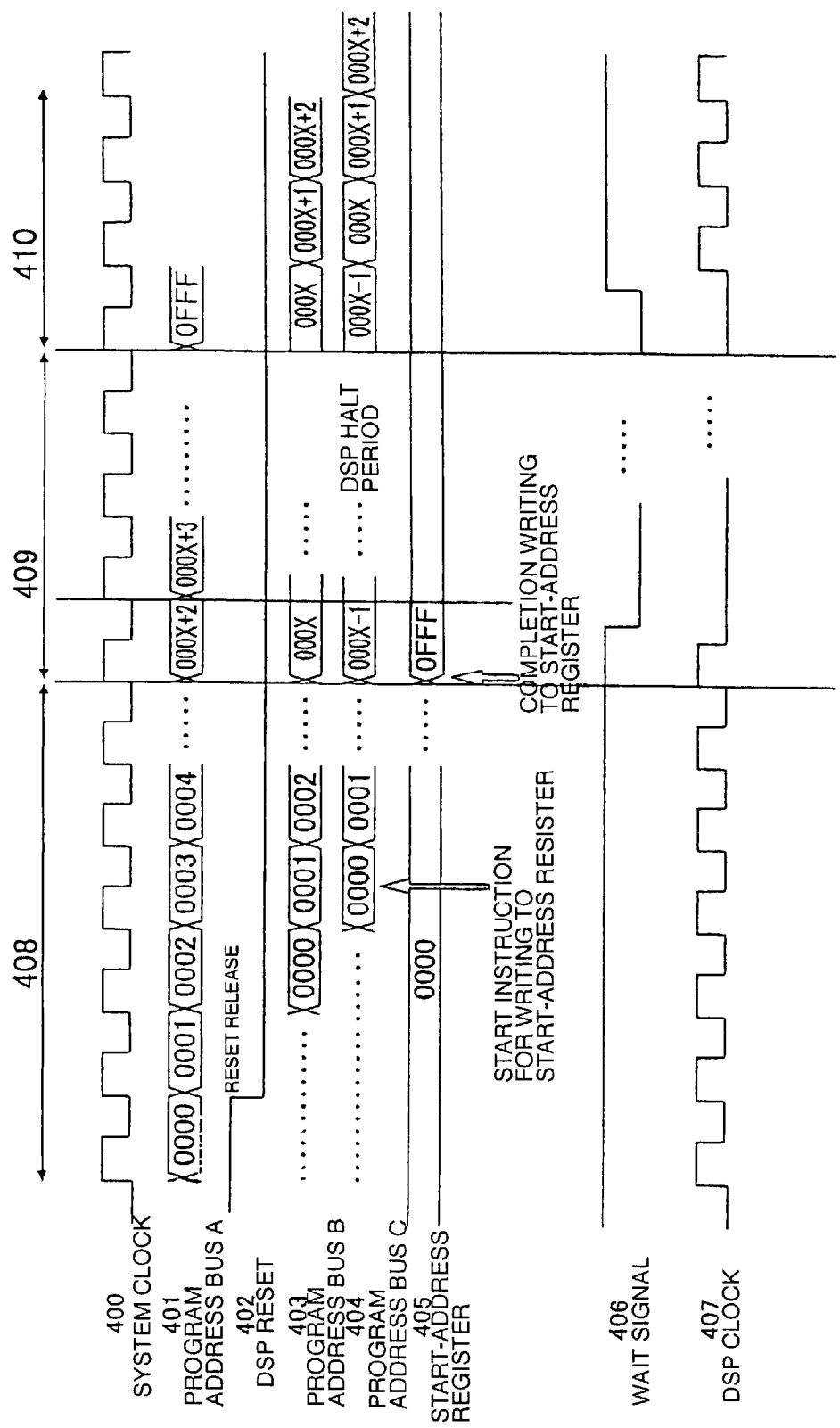
FIG. 4 is a timing diagram showing the operation of the digital signal processor system according to the second embodiment.

Subsequently, referring to FIGS. 3 and 4, operation of the digital signal processor system according to the second embodiment is described hereinafter. FIG. 4 is a timing diagram showing the operation of the digital signal processor system according to the second embodiment.

Data such as respective instructions of a program to be executed by the DSP 311 are outputted by the access controller 305, and are stored in a PRAM 308 via a program data bus A314. Accordingly, the DSP 311 reads the data stored in the PRAM 308, executing the instructions as read.

In this connection, the DSP 311 according to the second embodiment does not perform processing for reading a first instruction to be executed by the DSP 311 from the PRAM 308, but an instruction for initialization of the start-address register 317 is preset in the DSP 311.

The access controller 305 compares a value stored in the start-address register 317 with an address value of an address counter 306 to be stored in blocks of the PRAM 308, counted up in an ascending order, and keeps a wait signal 303 (a waveform 406), which is a halt signal, in the "ON" (low level) condition during a period when the value of the address counter 306 does not exceed the value of the start-address register 317. The initial value of the start-address register 317 is set to 0.

First, as shown in FIG. 4, processing operation in a period 408 before the DSP 311 makes a transition to the access halt condition is described hereinafter. Immediately after the DSP 311 makes a transition to an accessible condition as a result of a DSP reset 316 signal (a waveform 402) being outputted from the access controller 305 to the DSP 311, the wait signal 303 (a waveform 406), as the halt signal, remains in the "OFF" (high level) condition.

As shown in FIG. 4, an address value of the address counter 306 (a waveform 401) immediately after the DSP 311 makes a transition to the accessible condition is an address "0". Accordingly, since an instruction by the DSP 311 is executable starting from the address value at the address "0", the instruction for the initialization of the start-address register 317, already downloaded, is executed (the period 408).

The start-address register 317 is initialized and a value is stored therein. As shown in FIG. 4, the value stored therein is expressed as "0FFF" (a waveform 405) by the hexagonal numerical. The access controller 305 reads the value (the waveform 405) stored in the start-address register 317 via the start-address 318, and compares the value stored with the address value of the address counter 306 (the waveform 401).

When the access controller 305 determines as a result of comparison that the value stored in the start-address register 317 is higher, the same performs processing for causing the DSP 311 to make a transition to the access halt condition.

In a period 409 shown in FIG. 4, the DSP 311 is in a state of processing for transition to DSP access halt condition, and in the DSP access halt condition, and processing operation during the period is substantially same as that described with reference to the digital signal processor system 1 according to the first embodiment, omitting therefore detailed description thereof.

Further, as shown in FIG. 4, because the number of cycles necessary for storage processing of the value in the start-address register 317 varies depending on the type and configuration of the DSP 311, the same is expressed by use of a variable "X" in this case (waveforms 401, 403, and 404).

As shown by the waveform 401 in FIG. 4, in the case where the address value outputted from the address counter 306 reaches the value stored in the start-address register 317, for example, "00FF" in the case of the second embodiment, the access controller 305 outputs the wait signal 303 which is the halt signal, in the "OFF" (high level) condition, as indicated by the waveform 406, to a clock controller 307, thereby causing the DSP 311 to be released from the access halt condition (the processing for release from the DSP access halt condition).

Subsequently, processing operation during a period 410 after the DSP 311 is released from the access halt condition is described, however, the processing for release from the DSP access halt condition is substantially the same in contents as that described with reference to the digital signal processor system 1 according to the first embodiment, and detailed description thereof is therefore omitted.

Further, processing after the period 410, for example, processing in the case where there occurs branching to an access inhibit area, is substantially the same in contents as that described with reference to the first embodiment.

Thus, with the digital signal processor system 1 according to the second embodiment, it is ensured by the installation of the start-address register 317 that downloading and storage of data such as instructions of a program, up to the address value set in the start-address register 317, is completed, and consequently, by describing a program such that a branch instruction, and so forth are executed within the range of the address value, possibility of a temporary access halt condition at the time of execution is eliminated, so that an advantageous effect of enhancement in processing efficiency can be gained in addition to the advantageous effect of the first embodiment.

Third Embodiment

Figure 5:
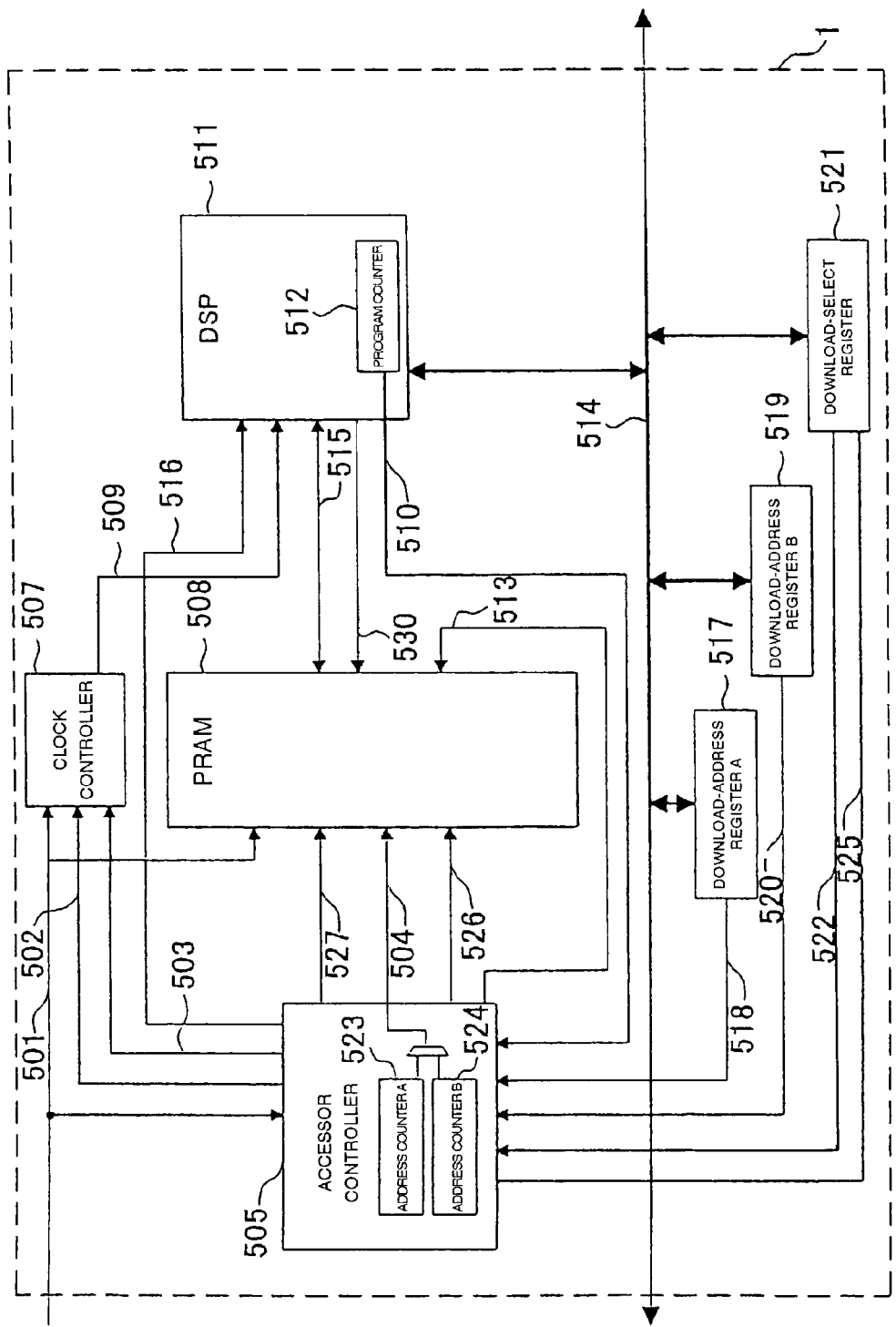
FIG. 5 is a block diagram showing the configuration of a third embodiment of the digital signal processor system according to the invention.

Next, referring to FIG. 5, the configuration of a third embodiment of a digital signal processor system according to the invention is described. FIG. 5 is a block diagram showing the configuration of the third embodiment of the digital signal processor system according to the invention.

As shown in FIG. 5, the digital signal processor system according to the third embodiment of the invention is obtained by adding a download-address register A517 for storing a storage-start address value, a download-address register B519 for storing a storage-complete address value, a data bus 514, a download-select register 521 which is a storage-select memory, an address counter B524, and an address counter A523 to the same system as the digital signal processor system according to the first embodiment, shown in FIG. 1.

The data bus 514 is connected to the download-address register A517 as well as the download-address register B519, and further to a DSP 511 for receiving and sending out data.

The download-address register A517 outputs a storage start signal to an access controller 505 via a download-address A518 while the download-address register B519 outputs a storage complete signal to the access controller 505 via a download-address B520.

The download-select register 521 is connected to the access controller 505 via a download-select 522 or a selector-reset 525. A value from the download-select register 521 as a storage select signal for selecting a register is inputted to the access controller 505 via the download-select 522. The access controller 505 initializes (resets) the download-select register 521 via the selector-reset 525.

Further, the access controller 505 comprises the address counter A523 for counting an address value to be downloaded in a PRAM 508 of a common type and to be stored in a block, and the address counter B524 for counting a designated address value when the DSP 511 is in an access halt condition.

Either the address counter A523 or the address counter B524 is selected by a signal outputted from the download-select register 521 via the download-select 522, and an address value of the address counter as selected is outputted to a program address bus A504. The other address counter which is not selected is turned into an access halt condition while keeping an address value thereof at the time when the same is selected.

Further, other devices configured in the digital signal processor system 1 according to the third embodiment are substantially the same in configuration as those of the digital signal processor system 1 according to the first embodiment, corresponding thereto, omitting therefore detailed description thereof.

Figure 6:
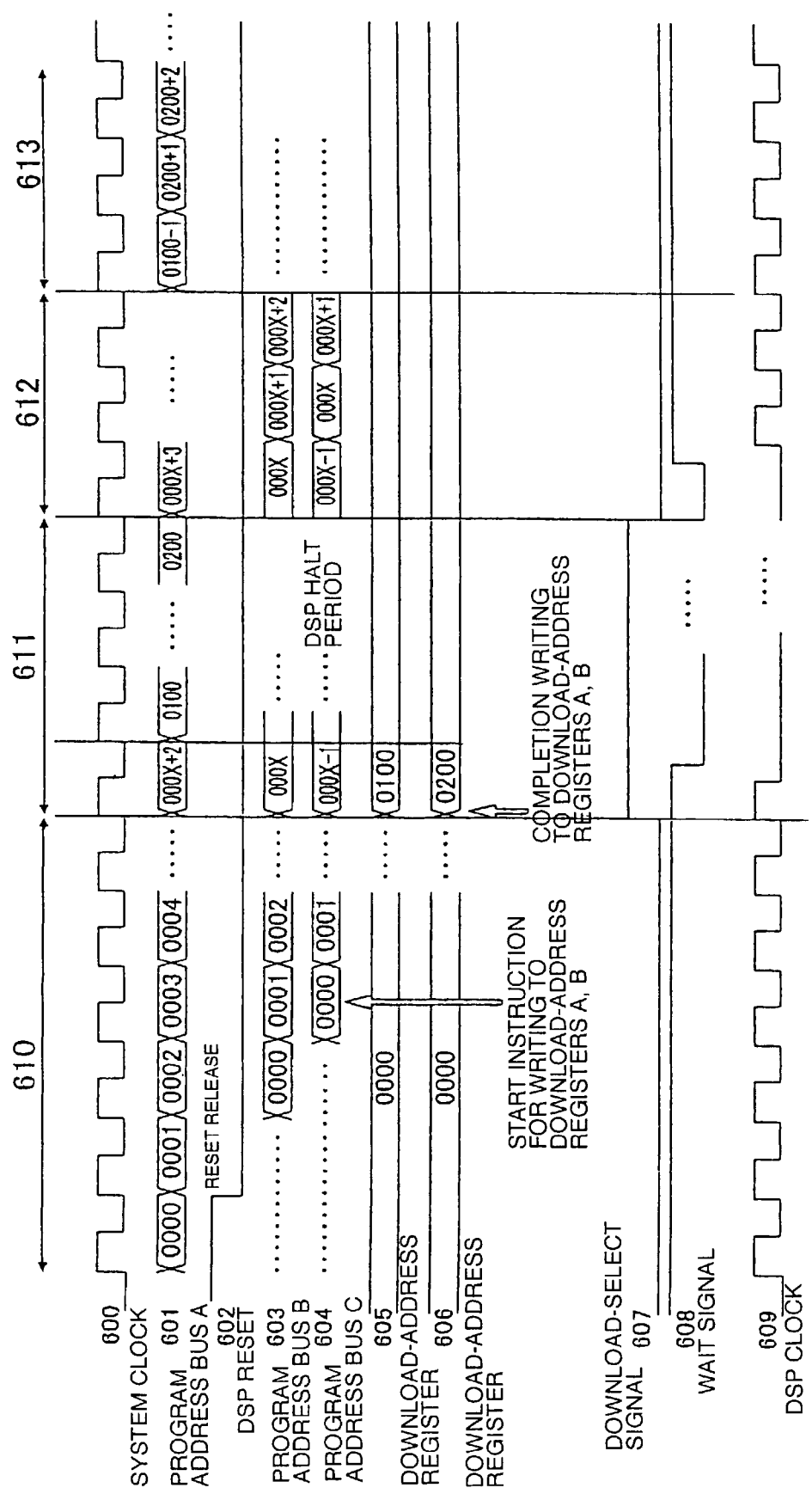
FIG. 6 is a timing diagram showing the operation of the digital signal processor system according to the third embodiment.

Subsequently, referring to FIGS. 5 and 6, operation of the digital signal processor system according to the third embodiment is described hereinafter. FIG. 6 is a timing diagram showing the operation of the digital signal processor system according to the third embodiment.

With a program to be executed by the DSP 511, data such as instructions of a program are downloaded and stored in the PRAM 508 from the access controller 505 via a program data bus A527, and a first instruction to be executed by the DSP 511 is to preset an initialization program whereby the download-address register A517 (a waveform 605) and the download-address register B519 (a waveform 606) are initialized, setting the download-select register 521 after completion of the initialization.

First, processing operation in a period 610 before the DSP 511 makes a transition to an access halt condition, as shown in FIG. 6, is described hereinafter. An initial value of the download-select 522 (a waveform 607) is set so as to select the address counter A523. That is, the waveform 607 (a download-select signal) shown in FIG. 6 is indicated at "0", indicating selection of the address counter A523.

Subsequently, the address counter A523 starts counting address values (initial value: "0000"), and upon inputting of a DSP reset 516 signal (a waveform 602) outputted from the access controller 505 to the DSP 511, the DSP 511 becomes accessible to the PRAM 508. At this point in time, a wait signal 503 (a waveform 608), which is a halt signal for turning the DSP 511 into the access halt condition, remains in the "OFF" (high level) condition.

Accordingly, the DSP 511 in accessible condition can execute an instruction starting from an address value of an address "0" where counting is started from a program counter 512, executing the initialization program as preset.

As shown in FIG. 6, according to the initialization program, the head address ("0100") where downloading and storage of the data such as the instructions of the program are first started is stored at the waveform 605 (the download-address register A517), and the final address ("0200") where the downloading and the storage are completed is stored at the waveform 606 (the download-address register B519).

Upon completion of the storage, a value for selecting the address counter B is outputted from the download-select register 521. As shown in FIG. 6, the waveform 607 indicates that a signal at "1" (high level) for selecting the address counter B is being outputted. The value outputted from the download-select register 521 is inputted to the access controller 505.

Next, a period 611 when the DSP 511 is in a state of the processing for transition to the DSP access halt condition, or in the DSP access halt condition is described. When "1" is set in the download-select register 521 of the waveform 607, the access controller 505 sets an address value of the download-address A518 of the waveform 605 in the address counter B524 (a waveform 601).

With the address counter B524 set as described above, the access controller 505 changes over an address value outputted to the program address bus A504 to be stored in a block from the address value counted by the address counter A523 to an address value counted by the address counter B524 as indicated by the waveform 601 in FIG. 6.

After the changeover, the data such as the instructions of the program, corresponding to address values sequentially counted and indicated by the address counter B524, are downloaded into the PRAM 508 from the access controller 505 via program data bus A527 to be stored in the PRAM 508 (the waveform 601).

Further, when a download-select 522 signal (the waveform 607) is changed over to "1" (high level) after processing for the changeover, the access controller 505 executes the processing for transition of the DSP 511 to the DSP access halt condition.

The processing for transition of the DSP 511 to the DSP access halt condition according to the present invention is substantially same as that described with reference to the first embodiment, omitting therefore detailed description thereof.

Further, with the DSP 511 in the access halt condition during the period 611, an address value of the program address bus A504 is set to the address value ("0100") already stored in the download-address register A517, and, on the basis of the address value described, the data such as the instructions of the program are downloaded (the waveform 601).

In the case where the address value of the program address bus A504 reaches an address value ("0200") stored in the download-address register B519, the access controller 505 changes over the address value of the program address bus A504 to the address value of the address counter A523 which has been in a halt condition.

After the address value of the program address bus A504 is changed over to the address value of the address counter A523, the address counter A523 resumes counting. Further, the access controller 505 simultaneously initializes (resets) a value of the download-select register 521 to "0" through the selector-reset 525, and thereafter, executes processing for release from the DSP access halt condition.

The processing for release of the DSP 511 from the DSP access halt condition during a period 612 is substantially the same in contents as that described with reference to the first embodiment, detailed description thereof is therefore omitted.

With the processing according to the third embodiment, after an address value is stored in the download-address register A517 and the download-address register B519, respectively, the data such as the instructions of the program, in a range from the address value shown in the download-address register A517 to the address value shown in the download-address register B519, are stored in the PRAM 508, and thereafter, processing for the access from the DSP 511 to the PRAM 508, and processing for the execution of the instructions according to the first embodiment are performed.

Further, as shown in a period 613 in FIG. 6, the address counter A523 (the waveform 601), normally selected from the access controller 305, designates a count of address values in an ascending order (sequentially) from an address "0" to be stored in blocks, but has a function such that, when a designated address value reaches an address value one address short of the address value inputted from the download-address A518, an address value stored in the download-address B520 is caused to jump to an address value one address after an address value to be inputted to the address counter A523.

As indicated by the waveform 601 (period 613) in FIG. 56, the address value one address short of the address value inputted from the download-address A518 is "0100−1", and the address value one address after the address value to be inputted to the address counter A523 is "10200+1".

Accordingly, this shows that address values from an address "0100" succeeding the "0100−1" as above to an address "0200" one address short of the "0200+1" above are skipped over.

That is, by use of the address counter B524, counting of addresses is executed in this way, thereby preventing duplication of writing to areas of address values which have already been downloaded and stored in the PRAM 508.

Furthermore, after a series of processing according to the third embodiment, such as processing for changeover from the address counter A523 to the address counter B524, the access controller 505 causes a value of the download-select register 521 to revert to "0" via the selector-reset 525, thereby enabling the processing described above to be repeated while the access controller 505 is downloading the data such as the instructions of the program.

As described in the foregoing, with the third embodiment, an advantageous effect can be gained in addition to the advantageous effect of the first embodiment in that processing is executed for downloading and storing the data such as instructions of a program in a block area between address values stored beforehand in the download-address register A517 and the download-address register B519, respectively, and thereafter, the DSP 511 starts processing.

By performing programming such that all branching destinations in a program are included in the block area between both the address values described above, it is possible to eliminate branching to access inhibit areas when access from the DSP 511 to the PRAM 508 is made, and also a possibility of the DSP 511 being in the access halt condition at the time of execution, thus improving processing efficiency.

Further, by causing the value of the download-select register 521 to revert to "0", the DSP 511 can be kept in the DSP access halt condition while the access controller 505 is downloading the data such as the instructions of the program to be stored in blocks, and it is possible to repeat the processing described above whereby data such as instructions of a program in a block area between given address values are downloaded and stored in blocks.

It follows that, for example, in the case where the access halt condition occurring to the DSP 511 due to, an instruction of a branching destination within a program causes inconveniences, further improvement in processing capacity can be expected by adding program description for executing processing to download data in a block area between given address values to be stored in blocks before branching.

Fourth Embodiment

Figure 7:
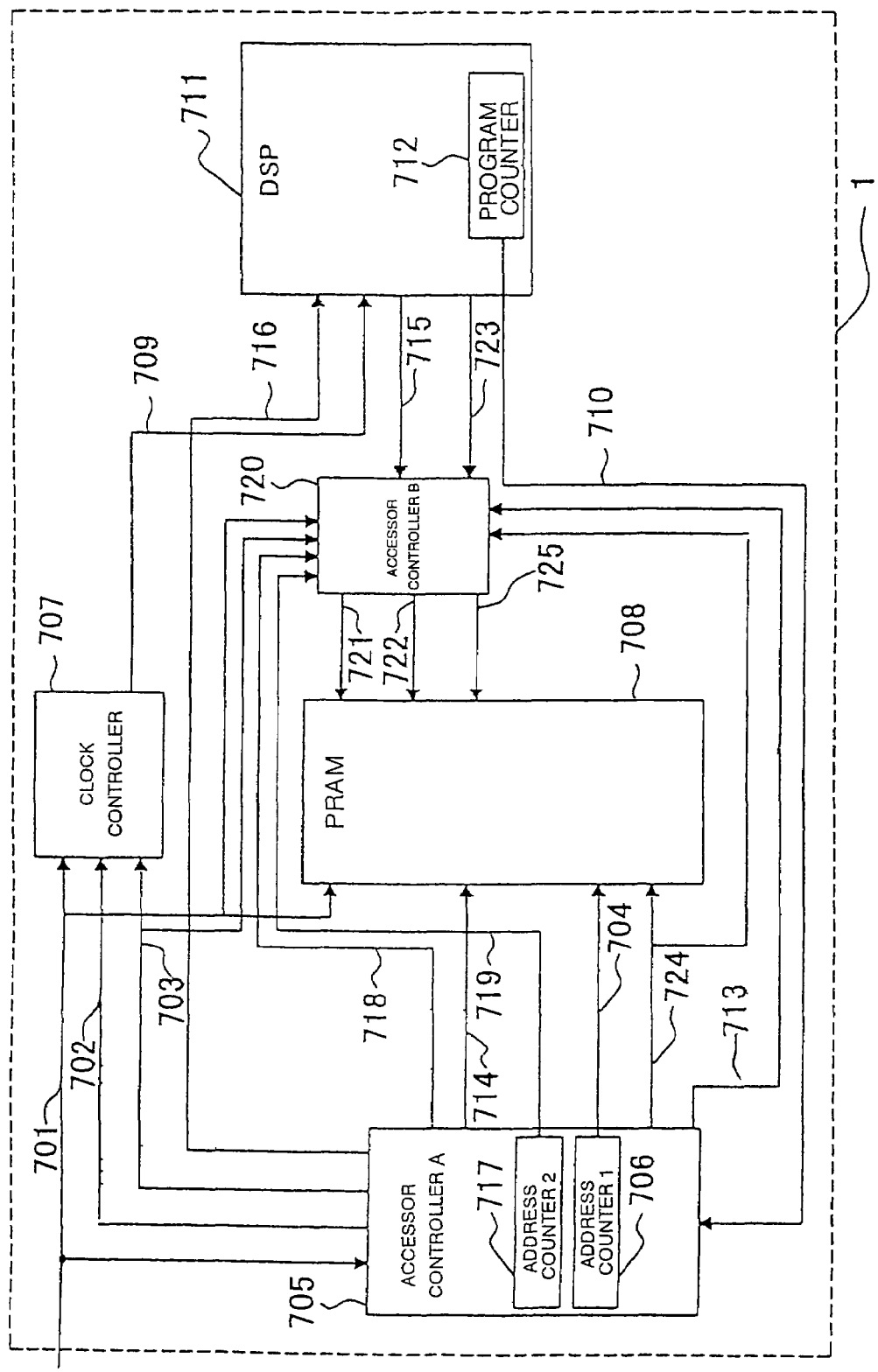
FIG. 7 is a block diagram showing the configuration of a fourth embodiment of the digital signal processor system according to the invention.

Next, referring to FIG. 7, the configuration of a fourth embodiment of a digital signal processor system according to the invention is described. FIG. 7 is a block diagram showing the configuration of the fourth embodiment of the digital signal processor system according to the invention.

As shown in FIG. 7, the digital signal processor system according to the fourth embodiment of the invention is obtained by adding an access controller B720 to the same system as the digital signal processor system according to the first embodiment, shown in FIG. 1.

An access controller A comprises two address counters 706, and 717. An address value outputted from the address counter 706 is connected to a PRAM 708 via a program address bus A704, and an address value outputted from the address counter 717 is connected to the access controller B720 via a program address bus D719.

Further, a program data bus C718 for outputting data corresponding to an address value indicated by the program address bus D719, outputted from the access controller A705, is also inputted to the access controller B720.

A program address, outputted by a DSP 711, which is controlled and outputted by the access controller A705 through a program address bus C713, and a wait signal 703, which is a halt signal for turning the DSP 711 into an access halt condition, are inputted to the access controller B720.

Further, the access controller B720 outputs to a program address bus E722 for changing over a signal inputted thereto, corresponding to a value of the wait signal 703, and a program data bus D721 while outputting a R/W control signal C725 for controlling read/write to the PRAM 708.

Still further, a R/W control signal A723 for controlling read/write from the DSP 711, and a R/W control signal B724 from the access controller A705 are inputted to the access controller B720.

Other devices configured in the digital signal processor system 1 according to the fourth embodiment are substantially the same in configuration as those of the digital signal processor system 1 according to the first embodiment, corresponding thereto, omitting therefore detailed description thereof.

Figure 8:
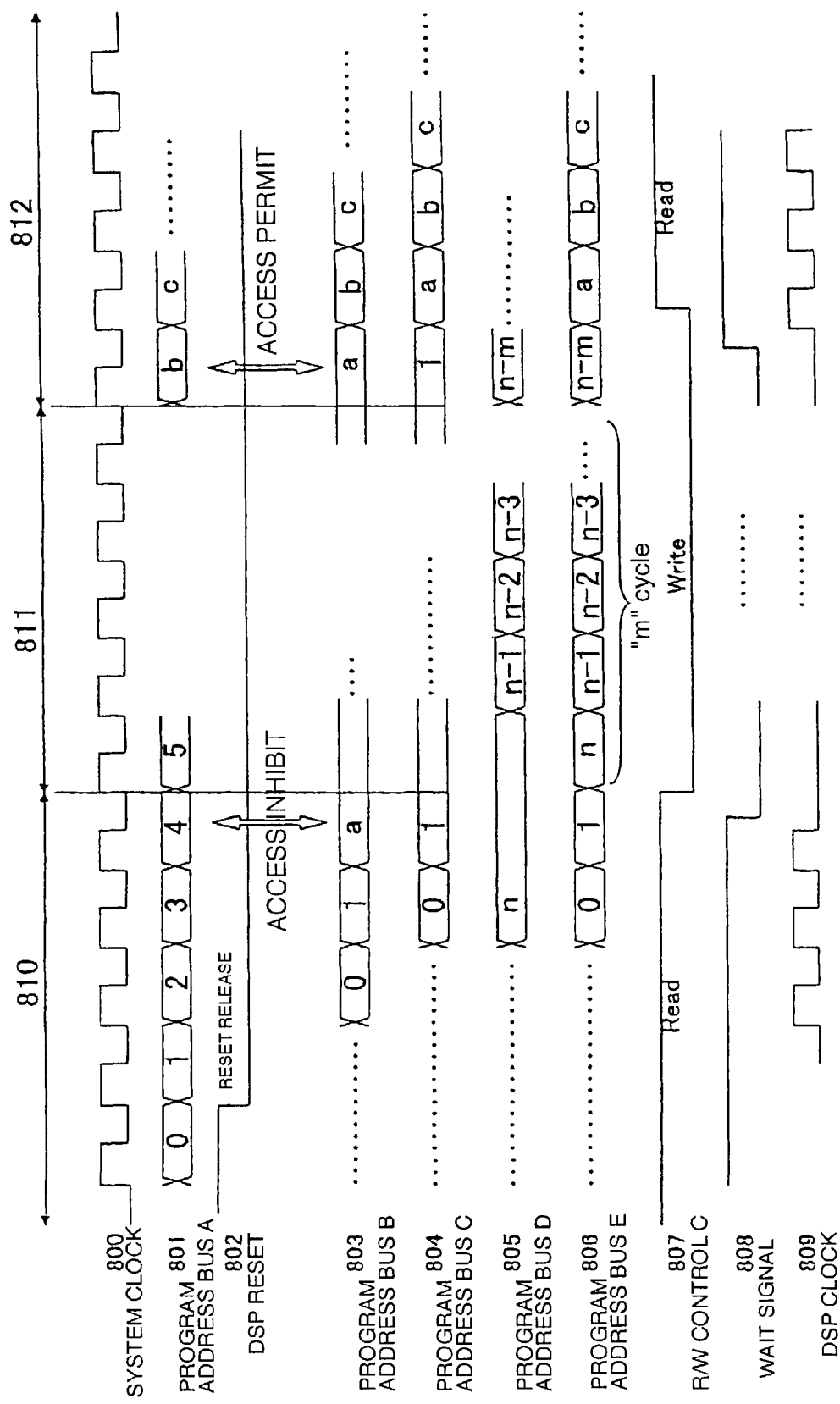
FIG. 8 is a timing diagram showing the operation of the digital signal processor system according to the fourth embodiment.

Subsequently, referring to FIGS. 7 and 8, operation of the digital signal processor system according to the fourth embodiment is described hereinafter. FIG. 8 is a timing diagram showing the operation of the digital signal processor system according to the fourth embodiment.

First, as shown in FIG. 8, operation in a period 810 when the DSP 711 of the digital signal processor system starts processing, and operation in a period 812 which is a period from the end of the DSP access halt condition of the DSP 711 up to post-release of the DSP 711 from the DSP access halt condition are substantially the same in contents as those described with reference to the first embodiment, and detailed description thereof is therefore omitted.

To describe the operation in the period 810 briefly before describing operation in a period 811, the access controller B720 outputs the program address from the program address bus C713 (a waveform 804), outputted from the DSP 711 and controlled by the access controller A705, and the R/W control signal A723 outputted from the DSP 711 to the PRAM 708 via the program address bus E722, and the R/W control C725 (a waveform 807), respectively.

The access controller B720 acquires data such as instructions of a program from the PRAM 708 via the program data bus D721, and outputs the same to the DSP 711 via a program data bus B715.

Now, operation in the period 811 which is a period spanning from processing for transition to the DSP access halt condition up to processing for the DSP access halt condition is described hereinafter.

As with the processing for transition to the DSP access halt condition according to the first embodiment, the access controller A705 compares an address value of the program address bus A704 (a waveform 801) outputted from the address counter 706 with an address value of a program address bus B710 (a waveform 803), outputted from a program counter 712, and when it is detected as a result of comparison that the DSP 711 is in the access inhibit area, the processing for transition to the DSP access halt condition is performed against the DSP 711.

Further, after it is detected that the DSP 711 is in the access inhibit area, by the agency of the wait signal 703 (a waveform 808) at "0" (low level), inputted to the access controller B720, an interface between the access controller B720 and the PRAM 708, for use in the DSP 711 making access to the PRAM 708, is changed over so as to be usable as an interface for the access controller A gaining access to the PRAM 708 when the DSP 711 is in the access inhibit-area.

In other words, in case it is detected that a value (the waveform 803) of the program address bus B710 is in the access inhibit area, the access controller A705 turns the wait signal 703 into "0" (ON) (the waveform 808).

After the wait signal 703 (the waveform 808) is turned into "0" (low level), the processing for transition to the DSP access halt condition is performed and thereby the DSP 711 is turned into the access halt condition.

After the wait signal 703 (the waveform 808) is turned into "0" (low level), the access controller B720 changes over an input interface from the program address bus C713 and the R/W control B724 to the program address bus D719 and the R/W control B724, outputting to the PRAM 708 via the program address bus E722 and the R/W control C725, respectively.

Further, the access controller B720 outputs data such as instructions of a program, corresponding to an address value of the program address bus D719, outputted from the access controller A705 via the program data bus C718, to the PRAM 708 via the program data bus D721.

As a result, although the DSP 711 reads program data via the program data bus D721 in the period 810, the program data can be downloaded and stored in the PRAM 708 from the access controller A705 via the program data bus D721 in the period 811 when the DSP 711 is in the access halt condition.

As shown in FIG. 8, the last address of program data for downloading data such as instructions of a program, which is the initial value of the address counter 717 (a waveform 805), is shown as "n", and processing is performed while the DSP 711 is in the access halt condition such that the program data are sequentially downloaded and stored at addresses in the order of n−1, n−2, ¼, starting from an address "n" of the initial value, until the release of the DSP 711 from the DSP access halt condition. With the fourth embodiment, the number of words downloaded via the program data bus D721 of the access controller B is indicated by m (waveforms 805, 806).

Further, in the case where the DSP 711 is released from access inhibit in the period 812 against an address "a" (the waveform 803), to which the DSP 711 attempted to make access, processing for release of the DSP 711 from the DSP access halt condition is substantially the same in contents as that described with reference to the first embodiment.

After the wait signal 703 (the waveform 808) which is a halt signal, outputted from the access controller A705, is turned to "1" (high level) following the processing for release of the DSP 711 from the DSP access halt condition, the access controller B720 changes over to a condition where the DSP 711 is able to read the program data stored in the PRAM 708, that is, changes over the input interface from the program address bus D719 and the R/W control B724 to the program address bus C713 and the R/W control B724 in order to revert the input interface of the program address bus E722, and the program data bus D721, respectively, to the condition in the period 810.

Meanwhile, the address counter 717 of the access controller A705 keeps its value existing up to the processing for release of the DSP 711 from the DSP access halt condition (the waveform 805).

Accordingly, the address counter 706 (the waveform 801) downloads the program data in the PRAM 708 via the program address bus A704 and the program data bus A714 to be stored in blocks in the order of addresses, 0, 1, 2, ¼, starting from an address 0, which is the initial value thereof.

Further, while the DSP 711 is in the DSP access halt condition, the address counter 717 (the waveform 805) downloads the program data via the program address bus E722 and the program data bus D721 in the order of the addresses, n, n−1, n−2, ¼ in that order from the address n, which is the final address for downloading the data such as the instructions of the program.

When an address value of the address counter 706 coincides with that of the address counter 717, the access controller A705 turns a download complete signal 702 (not shown) ON, transmitting completion of downloading the whole program in the PRAM 708 to a clock controller 707.

As described in the foregoing, with the fourth embodiment, an advantageous effect can be gained in addition to the advantageous effect of the first embodiment in that, when the DSP 711 is in the DSP access halt condition, the program is downloaded via the program address bus D719 and the program data bus C718, for use in enabling DSP 711 to make access to data such as the instructions of the program.

Accordingly, the access controller A705 is able to download the program data in the PRAM 708 through both the program address bus A704 and the program data bus C718, thereby enabling time for downloading the program data to be further reduced.

Further, the digital signal processor system according to the fourth embodiment is described hereinbefore taking an example wherein the invention is applied to the same system as the digital signal processor system 1 according to the first embodiment. However, it is to be understood that the present embodiment is not limited to such an example, and may be similarly applied to the same system as the digital signal processor system according to the second, and third embodiments, respectively, as well.

Fifth Embodiment

Figure 9:
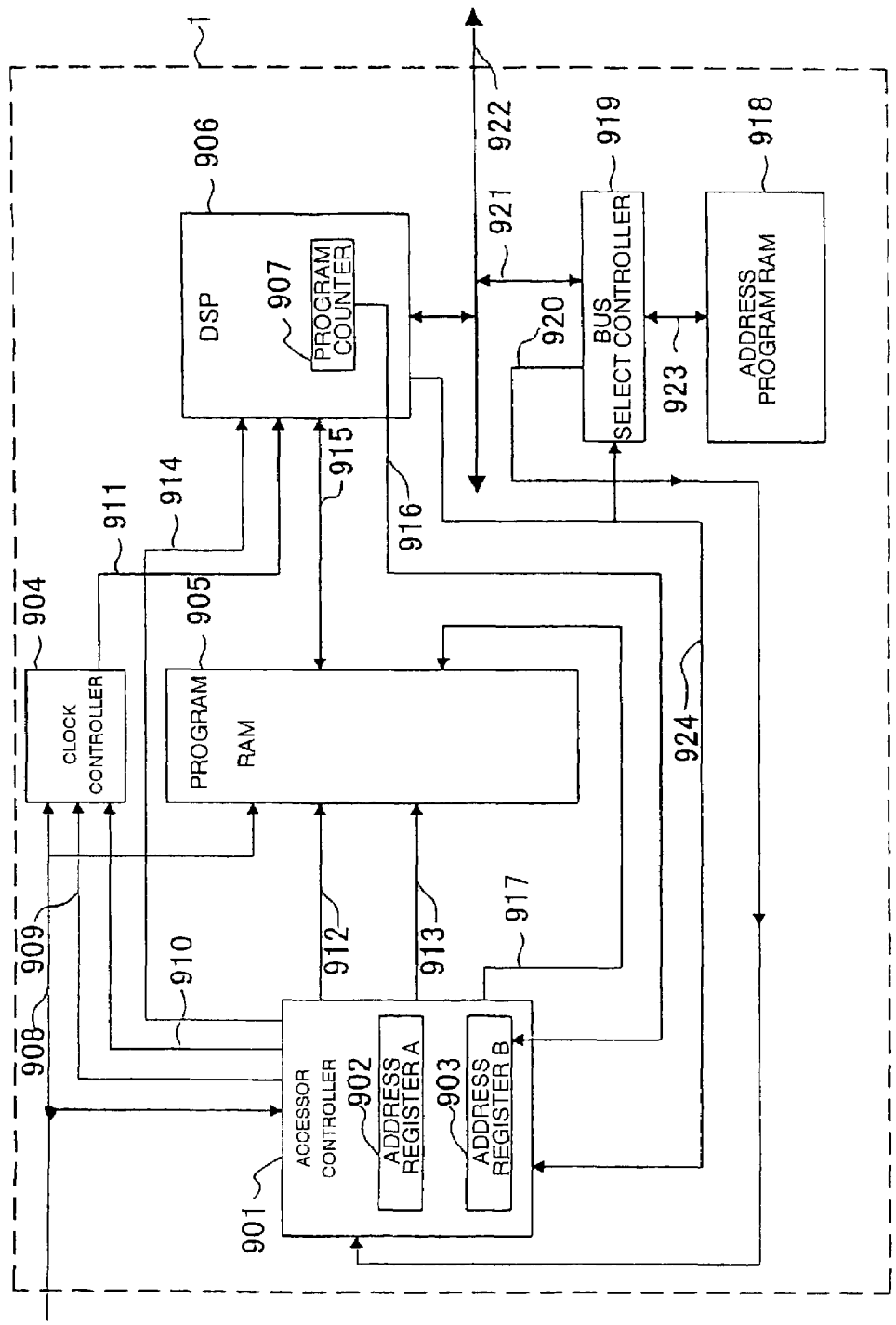
FIG. 9 is a block diagram showing the configuration of a fifth embodiment of the digital signal processor system according to the invention.

Next, referring to FIG. 9, the configuration of a fifth embodiment of a digital signal processor system according to the invention is described. FIG. 9 is a block diagram showing the configuration of the fifth embodiment of the digital signal processor system according to the invention.

As shown in FIG. 9, the digital signal processor system according to the fifth embodiment of the invention is obtained by adding a data bus 922, an address program RAM 918, and a bus select controller 919 to the same system as the digital signal processor system according to the first embodiment, shown in FIG. 1.

An access controller 901 is provided with an address register A902, and an address register B903 in place of the address counter 106 in the case of the first embodiment, and further, has a function capable of executing several instructions such as address arithmetic, decoding, and so forth.

Further, other devices configured in the digital signal processor system 1 according to the fifth embodiment are substantially the same in configuration as those of the digital signal processor system 1 according to the first embodiment, corresponding thereto, omitting therefore detailed description thereof.

Figure 10:
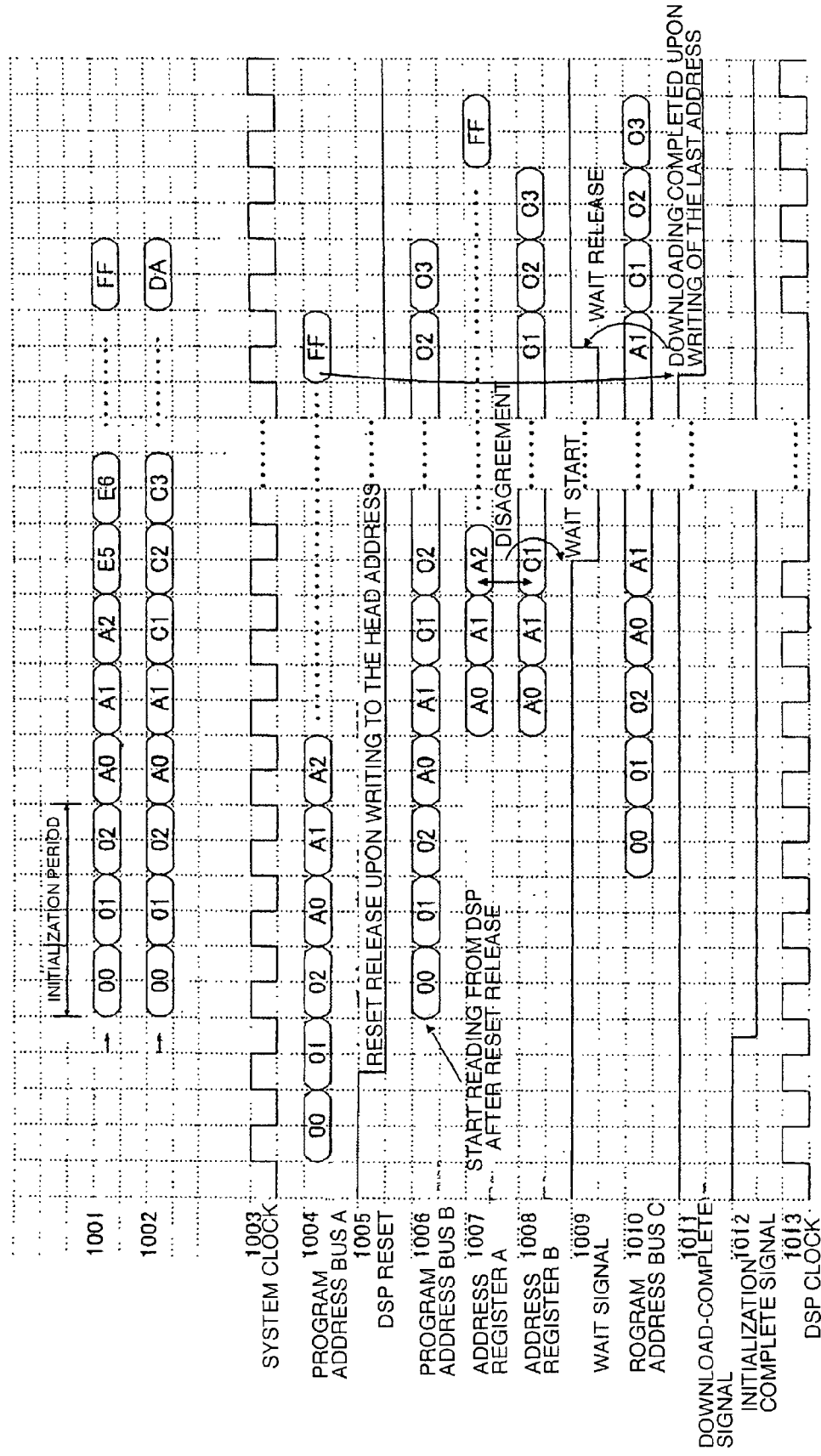
FIG. 10 is a timing diagram showing the operation of the digital signal processor system according to the fifth embodiment.

Subsequently, referring to FIGS. 9 and 10, operation of the digital signal processor system according to the fifth embodiment is described hereinafter. FIG. 10 is a timing diagram showing the operation of the digital signal processor system according to the fifth embodiment.

The access controller 901 executes downloading of data such as instructions of a program in a PRAM 905 to be stored in blocks. The program to be downloaded is a program having preset information for executing initialization of the address program RAM 918 in a header portion of the program.

First, as an initialization routine (an initialization period, the access controller 901 writes to a head address of the PRAM 905, and upon completion of writing to the head address, a DSP reset 914 is released. As shown in FIG. 10, when a waveform 1005 is turned to "0" (low level), the access controller 901 permits access from a DSP 906 to the PRAM 905 (a waveform 1006).

Subsequently, the DSP 906 starts execution of a program. The contents of the program, first executed by the DSP 906, is processing for the initialization of the address program RAM 918 preset at the header of the program. The DSP 906 executes the initialization of data in the address program RAM 918 via a data bus 922. During the processing for the initialization, an initialization complete signal 924 (a waveform 1012) indicates an initialization condition. As shown in FIG. 10, this is a time when the waveform 1012 is at "1" (high level). Responding to the initialization condition as described, a bus select controller 919 selects a path 921 "a".

As shown by a waveform 1004 in FIG. 10, the access controller 901 performs processing for downloading addresses of data, on the initialization information of the program, into the PRAM 905 to be stored therein while increasing respective address values by an increment. As indicated by the waveform 1006, the DSP 906 makes access to the PRAM 905 in such a way as to follow the processing for storage in the PRAM 905 as indicated by the waveform 1004, thereby executing the program. As a result of the execution of the program as described above, processing for writing the data to the address program RAM 918 is performed.

The access controller 901 downloads all the initialization information into the PRAM 905 to be stored in blocks while the DSP 906 makes access to the blocks where the initialization information is stored, thereby completing the execution of the program, whereupon the initialization complete signal 924 (the waveform 1012) indicates completion of the initialization. As shown in FIG. 10, this is a time when the waveform 1012 is at "0" (low level). Upon receiving the initialization complete signal 924 at "0", the bus select controller 919 selects a path 920 "b".

Upon completion of the initialization of the address program RAM 918, the address program RAM 918 will be in a state at this point in time where codes indicating the sequence of addresses, in which the access controller 901 downloads the program data into the PRAM 905 to be stored in blocks in the course of post-initialization, have been stored in the address program RAM 918 (a waveform 1001).

After the initialization, the access controller 901 reads an address data signal 923, which is a code stored, from the address program RAM 918, and decodes the same, thereby determining an address value of a program address bus A913. As a result, the sequence of addresses in which downloading is executed is as indicated by the waveform 1001 shown in FIG. 10.

Then, in a post-initialization routine, the address value indicated by the program address bus A913 is written to the address register A902, and an address value indicated by a program address bus B916 is written to the address register B903. In this case, initial writing to the address register A902 and initial writing to the address register B903 are executed at the same timing (waveforms 1007 and 1008).

That is, as shown in FIG. 10, a timing at which an address value "A0" of the waveform 1007 is written is identical to a timing at which an address value "A0" of the waveform 1008 is written.

And the address value of the address register A902 is constantly compared with the address value of the address register B903. A sequence of writing to the PRAM 905 complies with information as decoded from the address data signal 923 of the address program RAM 918, inputted to the access controller 901, and if the information is in agreement with a program sequence to be executed by the DSP 906, both the address value of the address register A902 and the address value of the address register B903 coincide with each other.

In case the results of comparison show that both the address values do not coincide with each other, this represents a case where the DSP 906 attempts to execute a program sequence differing from the sequence according to the decoded information of the address program RAM 918.

Accordingly, in the case of both the address values being in disagreement with each other, the access controller 901 turns a wait signal 910, which is a halt signal, to "0" (ON). As shown in FIG. 10, a waveform 1009 representing the wait signal is turned to "0" (ON).

As shown by address values indicated the waveform 1007 and the waveform 1008, respectively, in FIG. 10, with respect to first address values "A0" and "A1", the waveform 1007 and the waveform 1008 are in agreement with each other, however, it is shown that there occurs disagreement between both the waveforms as for a subsequent address value, since the subsequent address value of the waveform 1007 is "A2" while that of the waveform 1008 is "C1".

Upon the wait signal 910 (the waveform 1009) being turned "ON" (low level), a clock controller 904 causes a DSP clock 911 to stop making access so as to keep a waveform 1013 shown in FIG. 10 at "0" (low level). Accordingly, access to the access controller 901 via a program address bus B916 will be in a halt condition. Herein, to cause the DSP clock 911 to stop making access is substantially the same in contents as the processing for transition to the DSP access halt condition described with reference to the first embodiment.

In the case of the DSP clock 911 (the waveform 1013) being in the halt condition, the access controller 901 executes downloading and storing of data, such as instructions of a program, in the PRAM 905, up to the last address indicated by the address program RAM 918, via the program address bus A913. As shown in FIG. 10, upon the waveform 1004 (the program address bus A913) indicating the last address "FF", a waveform 1011 (a download complete signal 909) is turned to "0" (ON).

Upon receiving the download complete signal 909 (the waveform 1011), which is turned "ON" (low level), the access controller 901 turns the wait signal 910 to "1" (high level) in order to perform processing for release of the DSP 906 from the DSP access halt condition, thereby effecting release from the access halt condition (the waveform 1009). Further, after the download complete signal 909 (the waveform 1011) is turned "ON", comparison of the address value of the address register A902 (the waveform 1007) with the address value of the address register B903 (the waveform 1008) is not performed.

After the processing for release of the DSP 906 from the DSP access halt condition, the DSP clock 911 resumes operation, so that the DSP 906 starts making access to the PRAM 905. By the time when the operation is resumed, data such as all instructions of the program have been downloaded in the PRAM 905 and stored in the blocks, enabling the DSP 906 to freely execute the program.

Further, in the case of the address value of the address register A902 (the waveform 1007) is constantly compared with the address value of the address register B903 (the waveform 1008), and the downloading of the program data is completed without disagreement in value therebetween, the wait signal 910 will not be turned ON, so that all the program data can be downloaded in the PRAM 905 and stored in the respective blocks.

As described in the foregoing, with the fifth embodiment, an advantageous effect can be gained in addition to the advantageous effect of the first embodiment in that by installing the access controller 901 and the clock controller 904, and by storing beforehand data describing the sequence of addresses, in which downloading is executed, in the address program RAM 918, it becomes possible to execute the operation of the DSP 906, which has been impossible before completion of downloading all the program data, substantially concurrently with downloading of the program in the PRAM 905, as long as the previously described sequence of addresses as stored is in agreement with the sequence of addresses, in which the DSP 906 actually makes access to the PRAM 905.

If there is not much of branching occurring in a program anticipated, there is cited, for example, a case where the DSP 906 is required to perform the same operation all the time, however, it is highly hoped that, by storing a sequence of addresses in accordance with a sequence of actual operations as data in the address program RAM 918, processing that starts substantially concurrently with the downloading of a program, can be implemented without resulting in the access halt condition of the DSP 906.

As described hereinbefore, the preferred embodiments of the invention have been described with reference to the accompanying drawings, however, the scope of the invention is not limited thereto. It will be obvious to those skilled in the art that various changes and modifications may be made without departing from the spirit and scope of the invention. It is therefore to be understood that all such changes and modifications are within the scope of the invention and the appended claims.

With the embodiments described above, there is described the case where a dual port RAM is applied to the PRAM by way of example, however, the invention is not limited thereto. The invention may be carried out, for example, in the case where a program area is divided into several banks, a single port RAM is employed for respective banks, and use is made of a selector for controlling an interface on the downloading side of a program and an interface on the DSP access side, thereby applying a plurality of single port RAMs to the PRAM.

Further, with the embodiments described above, there is described the case where the access controller and the start-address register are configured as an individual unit, respectively, by way of example, however, the invention is not limited thereto, and the invention can be carried out with the access controller and the start-address register, united together as a single unit.

Still further, with the embodiments described above, there is described the case where the access controller, the download-address register A, and the download-address register B or the download-select register are configured as an individual unit, respectively, by way of example, however, the invention is not limited thereto, and the invention can be carried out with a configuration wherein respective devices as described are variously combined with each other. For example, the invention can be carried out with the access controller, the download-address register A, the download-address register B, and the download-select register, united together as a single unit.

Yet further, with the embodiments described above, there is described the case where the access controller, and the address program RAM or the bus select controller are configured as an individual unit, respectively, by way of example, however, the invention is not limited thereto, and the invention can be carried out with a configuration wherein respective devices as described are variously combined with each other. For example, the invention can be carried out with the access controller, the address program RAM, and the bus select controller, united together as a single unit.

Further, with the embodiments described above, there is described the case where the start-address register, the download-address registers, and the download-select register or the address registers are configured as a register unit, respectively, byway of example, however, the invention is not limited thereto provided that these are memories capable of reading/writing. For example, the invention can be carried out with memories such as a RAM (Random Access Memory) instead.

Still further, with the embodiments described above, there is described the case where the DSP is used by way of example, however, the invention is not limited thereto. For example, the invention is applicable to a microprocessor and the like.

As described in detail hereinbefore, with the invention, it becomes possible to start and execute processing operation of the DSP, which has been forced to be in as-queued state until completion of the downloading of the whole program, thereby enabling time required for initialization of the program and time required for processing the program to be reduced.

What is claimed is:

1. A digital signal processor comprising:
   a programmable memory having a plurality of blocks each of which is capable of having an instruction of a program written therein and read therefrom;
   a processor for sequentially executing instructions stored in the programmable memory; and
   an access controller for sequentially storing the instructions of the program in the blocks of the programmable memory responsive to addresses indicating a location of blocks where the instructions are to be stored, the access controller controlling an access of the processor to the blocks,
   wherein upon receiving a data signal describing a sequence of addresses of the blocks where the instructions are stored, the access controller compares the addresses of the sequence with addresses corresponding to the blocks to which the processor has made access at every access, and when it is determined that disagreement in value exists there between, the processor is made to transition to an access halt condition.

2. A digital signal processor according to claim 1, wherein the access controller causes the processor to make the transition to the access halt condition when the processor attempts to gain access to a part of the blocks where a part of the instructions are not yet stored.

3. A digital signal processor according to claim 2, wherein the access controller keeps the processor in a state of the transition to the access halt condition before the part of the instructions are stored in the part of the blocks where the part of instructions are not yet stored, after the transition of the processor to the access halt condition.

4. A digital signal processor according to claim 2, wherein the access controller sequentially stores the instructions up to an address of a block, set in a start signal for releasing the processor from the access.

5. A digital signal processor according to claim 2, wherein the access controller sequentially stores the instructions and the part of the instructions not yet stored, in the part of the blocks, after the transition of the processor to the access halt condition.

6. A digital signal processor according to claim 1, wherein the access controller causes the processor to make transition to the access halt condition by transmitting a halt signal to a clock controller.

7. A digital signal processor according to claim 1, wherein the access controller causes the processor to be released from the access halt condition by use of a halt release signal.

8. A digital signal processor according to claim 1, wherein the access controller causes the processor to make the transition to the access halt condition upon receiving from a storage-select memory a storage select signal for changing over the instructions to be stored.

9. A digital signal processor according to claim 8, wherein the access controller stores the instructions in block areas between an address set in a storage-start signal and an address set in a storage-complete signal after the transition of the processor to the access halt condition upon receiving the storage select signal from the storage-select memory.

10. A digital signal processor according to claim 8, wherein the access controller prevents the instructions from being stored again in the block areas between the address set in the storage-start signal and the address set in the storage-complete signal, where the instructions are stored.

11. A digital signal processor according to claim 1, wherein the access controller sequentially stores the instructions in the blocks, starting from a block corresponding to an address where the disagreement in value exists up to a block corresponding to a last address of the instructions of the program after the transition of the processor to the access halt condition.

12. A digital signal processor comprising:
 a programmable memory for storing data including instructions of a program, the programmable memory having a first port and a second port;
 an access control circuit connected to the first port of the programmable memory, the access control circuit writing the data into the programmable memory and outputting a completion signal and a wait signal;
 a clock control circuit connected to the access control circuit, the clock control circuit outputting a DSP clock in response to the completion signal and the wait signal; and
 a DSP connected to the access control circuit, the clock control circuit and the second port of the programmable memory, the DSP operating when the DSP clock is received from the clock control circuit and reading the data stored in the programmable memory,
 wherein upon receiving a data signal describing a sequence of addresses of the programmable memory where the instructions are stored, the access control circuit compares the addresses of the sequence with addresses corresponding to the programmable memory to which the DSP has made access at every access, and when it is determined that disagreement in value exists there between, the DSP is made to transition to an access halt condition.

13. A digital signal processor according to claim 12, wherein the programmable memory, the access control circuit and the clock control circuit receive a system clock from an outside.

14. A digital signal processor according to claim 12, wherein the access control circuit outputs a reset signal to the DSP and the DSP is reset by the reset signal.

15. A digital signal processor according to claim 12, wherein the access control circuit includes an address counter coupled to the programmable memory for determining an address of the programmable memory where the data is to be stored.

16. A digital signal processor according to claim 15, further comprising:
 a data bus coupled to the DSP; and
 a start address register coupled to the data bus and the access control circuit for storing a predetermined address so that the access control circuit outputs a wait signal when the address counter counts up to the predetermined address.

17. A digital signal processor according to claim 12, wherein the DSP includes a program counter coupled to the access control circuit for outputting a program address.

18. A digital signal processor according to claim 12, wherein the access control circuit includes plural address counters, the digital signal processor further comprising:
 a data bus coupled to the DSP;
 a download address register coupled to the data bus and the access control circuit for notifying the access control circuit of a start and an end of a download performed by the DSP; and
 a download select register coupled to the data bus and the access control circuit, for providing a storage select signal that selects the address counters within the access control circuit.

* * * * *